(12) United States Patent
Bas et al.

(10) Patent No.: US 8,694,710 B2
(45) Date of Patent: Apr. 8, 2014

(54) CONVERSION OF A TWO-WIRE BUS INTO A SINGLE-WIRE BUS

(75) Inventors: Gilles Bas, Beauvoisin (FR); Hervé Chalopin, Aubagne (FR); François Tailliet, Fuveau (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 177 days.

(21) Appl. No.: 13/189,830

(22) Filed: Jul. 25, 2011

(65) Prior Publication Data

US 2012/0030388 A1     Feb. 2, 2012

(30) Foreign Application Priority Data

Jul. 27, 2010 (FR) ...................................... 10 56149

(51) Int. Cl.
     *G06F 13/42*      (2006.01)
     *G06F 13/38*      (2006.01)
     *G06F 13/40*      (2006.01)

(52) U.S. Cl.
     CPC .......... *G06F 13/385* (2013.01); *G06F 13/4027* (2013.01)
     USPC ................. 710/315; 710/30; 710/63; 710/70; 710/311

(58) Field of Classification Search
     USPC ....................................................... 710/315
     See application file for complete search history.

(56) References Cited

U.S. PATENT DOCUMENTS

| | | | |
|---|---|---|---|
| 5,495,469 A | | 2/1996 | Halter |
| 5,903,607 A * | | 5/1999 | Tailliet ........................... 375/257 |
| 6,112,275 A * | | 8/2000 | Curry et al. ................... 711/100 |
| 6,735,657 B1 * | | 5/2004 | Falk et al. ...................... 710/305 |
| 6,874,052 B1 | | 3/2005 | Delmonico |
| 7,111,097 B2 * | | 9/2006 | Lin ................................ 710/105 |
| 8,161,224 B2 * | | 4/2012 | Laurencin et al. ............. 710/315 |
| 8,230,151 B2 * | | 7/2012 | Hou et al. ...................... 710/307 |
| 2004/0049619 A1 * | | 3/2004 | Lin ................................ 710/105 |
| 2004/0208200 A1 * | | 10/2004 | Hejdeman et al. ............. 370/476 |
| 2006/0104396 A1 | | 5/2006 | Soriano et al. |
| 2007/0230614 A1 | | 10/2007 | Walker et al. |
| 2009/0013100 A1 * | | 1/2009 | Lee ................................. 710/30 |
| 2010/0017553 A1 * | | 1/2010 | Laurencin et al. ............. 710/307 |
| 2012/0054392 A1 * | | 3/2012 | Li .................................. 710/110 |
| 2012/0144078 A1 * | | 6/2012 | Poulsen ......................... 710/105 |

FOREIGN PATENT DOCUMENTS

WO    WO 2010010278 A1    1/2010

OTHER PUBLICATIONS

"The I2C-bus specificaiton"; Philips Semiconductors; Version 2.1; Jan. 2000; all pages.*

French Search Report dated Feb. 24, 2011 from corresponding French Application No. 10/56149.

(Continued)

*Primary Examiner* — Ryan Stiglic (74) *Attorney, Agent, or Firm* — Wolf, Greenfield & Sacks, P.C.

(57) ABSTRACT

A method of conversion by at least one interface circuit connected between a first bus including at least one data wire and one clock wire, and at least one second single-wire bus, of a transmission between a master circuit connected to the first bus and at least one slave circuit connected to the second bus, wherein a speculative read command is sent to the slave circuit before interpreting the state of a bit for controlling a reading or a writing, originating from the master circuit.

18 Claims, 5 Drawing Sheets

(56) References Cited

OTHER PUBLICATIONS

French Search Report dated Feb. 10, 2011 from related French Application No. 10/56148.
French Search Report dated Feb. 24, 2011 from related French Application No. 16/56152.
Menezes A.J. et al., Handbook of Applied Cryptography, PASSAGE, Jan. 1, 1997, Handbook of Applied Cryptography; [CRC Press Series on Discrete Mathematics and its Applications], CRC Press, Boca Raton, Florida, pp. I-II, 352, XP002357451, pp. 352-368.
Multiple Signatures using Security Multiparts; draft-ietf-openpgp-multsig-02.txt; D. Del Torto; Feb. 2001.
Digital Signature and Multiple Signature: Different Cases for Different Purposes; Chafic Maroun Rouhana Moussa; GSEC Practical Assignment Version 1.4b; Jul. 7, 2003.
Message authentication code—Wikipedia, the free encyclopedia, printed out in year 2012.

\* cited by examiner

CONVERSION OF A TWO-WIRE BUS INTO A SINGLE-WIRE BUS

CROSS REFERENCE TO RELATED APPLICATIONS

This application claims the priority benefit of French patent application number 10/56149, filed on Jul. 27, 2010, entitled CONVERSION OF A TWO-WIRE BUS INTO A SINGLE-WIRE BUS, which is hereby incorporated by reference to the maximum extent allowable by law.

BACKGROUND OF THE INVENTION

1. Field of the Invention

The present invention generally relates to electronic circuits and, more specifically, to the transmission of digital data between two circuits in a system of master-slave type. The present invention more specifically applies to the conversion of digital signals from a first bus of two-wire (data and clock) type to a second bus of single-wire type, and conversely.

2. Discussion of the Related Art

Many systems of conversion or interface between communication buses adapted to different protocols are known. Such systems are most often intended for multi-wire buses on both sides.

U.S. Pat. No. 6,066,964 describes a dynamic bus in which a communication can be completed on one phase or the other of a clock signal.

Patent applications US 2010/017553 and EP 2146287 describe a system of interface between a two-wire bus and a single-wire bus using the two half-periods of the clock signal of the two-wire bus by placing the data on a first half-period and a wait pattern on the other half period. This conversion method is a synchronous method in which the single-wire side of the transmission uses the clock on the two-wire side.

SUMMARY OF THE INVENTION

An embodiment is to provide an asynchronous conversion of a two-wire bus into a single-wire bus.

An embodiment is to provide a solution more specifically intended for transmissions between a master circuit connected on the two-wire bus side and one or several slave circuits connected by a single-wire bus.

An embodiment is to provide a solution in which a same conversion interface between the two buses may be connected, on the single-wire bus side, to one or several slave circuits.

An embodiment provides a method of conversion by at least one interface circuit connected between a first bus comprising at least one data wire and one clock wire, and at least one second single-wire bus, of a transmission between a master circuit connected to the first bus and at least one slave circuit connected to the second bus, wherein a speculative read command is sent to the slave circuit before interpreting the state of a bit for controlling a reading or a writing, originating from the master circuit.

According to an embodiment, said speculative command is a start-of-transmission signal.

According to an embodiment, the interface circuit is capable of transmitting towards the slave circuit, in addition to the start-of-transmission signal, a read control signal and an end-of-transmission signal.

According to an embodiment, an error message on the single-wire bus side corresponds to a low state having a longer duration than the low state of a normal transmission.

According to an embodiment, on the single-wire bus side, a slave circuit which sends a frame demodulates the frame that it sends and performs, at the end of the transmission, a comparison between the frame to be sent and the demodulated frame, to send the error message in the occurrence of an inconsistency.

According to an embodiment, the master circuit starts a transmission by sending two successive frames respectively comprising the address of an interface circuit and the address of a slave circuit.

According to an embodiment, the master circuit starts a transmission by sending a frame comprising the common address of an interface circuit and of a slave circuit.

An embodiment also provides a transmission system, comprising:

a master circuit capable of transmitting data according to an I2C protocol;

at least one interface circuit between this I2C protocol and a single-wire bus protocol; and at least one slave circuit per interface circuit capable of communicating with this interface circuit according to a single-wire protocol.

According to an embodiment, the interface circuit automatically detects the addressing mode adopted by the master circuit.

The foregoing and other objects, features, and advantages embodiments will be discussed in detail in the following non-limiting description of specific embodiments in connection with the accompanying drawings.

DETAILED DESCRIPTION

The same elements have been designated with the same reference numerals in the different drawings. For clarity, only those elements which are useful to the understanding embodiments have been shown and will be described. In particular, the generation of the data flows by the master and slave circuits has not been detailed, embodiments being compatible with usual generation systems.

Figure 1:
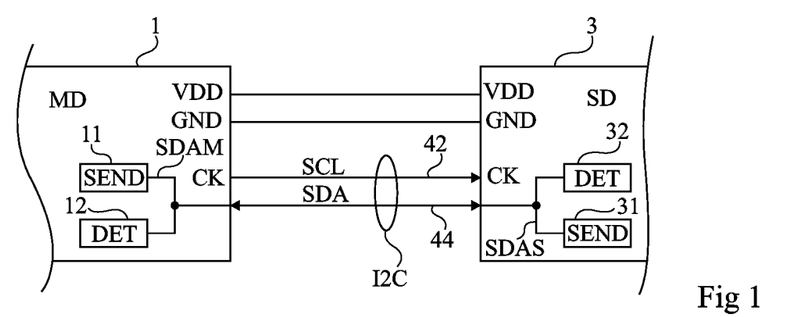
FIG. 1 partially shows in the form of blocks two circuits capable of communicating in an I2C-type master-slave protocol.
Figure 2A:
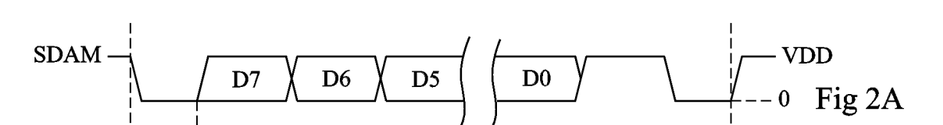
FIGS. 2A, 2B, 2C, and 2D illustrate a communication between the two circuits of FIG. 1.
Figure 2B:
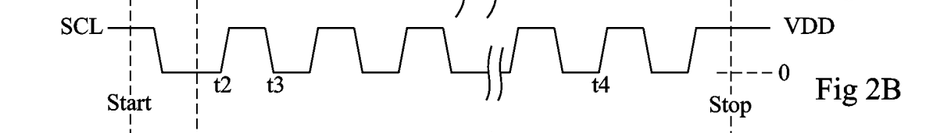
Figure 2C:
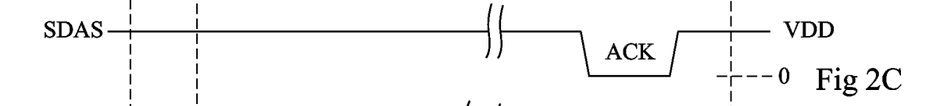
Figure 2D:
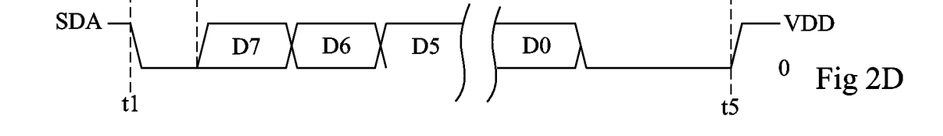

FIG. 1 is a block diagram of an embodiment of a system of communication between a master device 1 and a slave device 3 according to the I2C protocol.

In the example of FIG. 1, circuit 1 is a master device (MD) and is capable of communicating, over an I2C bus, with one or several slave devices 3 (SD). The different circuits of the system may be powered independently from one another or, as shown, by a power supply bus capable of conveying at least a power supply voltage VDD and a reference voltage GND, for example, the ground.

Each circuit 1, 3, for example, comprises a transmit circuit (SEND) 11, 31 and a receive circuit (DET) 12, 32. Circuits 1 and 3 are connected to each other by the I2C bus as well as by the two wires VDD and GND of the power supply bus. A first wire 42 of bus I2C conveys a clock signal (SCL) between two terminals CK of circuits 1 and 3. Typically, this clock signal is imposed by master circuit 1. A second wire 44 of bus I2C conveys the data (SDA) between the two circuits. Bus I2C is bidirectional.

FIGS. 2A, 2B, 2C, and 2D are timing diagrams illustrating a communication between circuits 1 and 3 of FIG. 1. These drawings illustrate an example of transmission of a data word (typically a byte) from master circuit 1 to slave circuit 3.

To clarify the description, FIGS. 2A, 2B, 2C, and 2D show the shape of signals respectively corresponding to the signal (SDAM) set by transmit circuit 11 of the master circuit on wire 44, to clock signal SCL imposed by the master circuit, to the signal (SDAS) set by circuit 31 on wire 44, and to level SDA resulting from this wire. Despite the simplified representation of FIG. 1, it is considered that the respective receive circuits 12 and 32 of circuits 1 and 3 observe the state of wire 44 independently from levels SDAM and SDAS imposed by transmit circuits 11 and 31. Similarly, for simplification, the voltage drops with respect to the power supply voltages are neglected and it is considered that the high levels correspond to voltage VDD and that the low levels correspond to ground.

In the idle state, both wires 42 and 44 of bus I2C are in the high level. Assuming that circuit 1 wants to transmit a data frame to circuit 3, it takes control of the bus by imposing a low level on signal SDA (time t1) while signal SCL remains in the high level. Once this starting condition (Start) is achieved, circuit 1 generates clock signal SCL. Then, circuit 1 imposes a level 1 or 0 on wire 44 (signals SDAM and SDA) according to the first bit D7 of the byte to be transmitted. This setting of the level of wire 44 must occur before the rising edge of the clock signal (time t2) which validates the transmitted data. When signal SCL returns to the low level (time t3), master circuit 1 can impose the level corresponding to the state of the next bit D6 on wire 44, and so on. Once last bit D0 has been transmitted, the master circuit sets signal SDAM to the high state, to monitor the arrival of an acknowledgement. Its detection circuit 12 monitors, at the same time, the real state of wire 44. To indicate a correct reception, slave circuit 3 imposes a low level (FIG. 2C) on wire 44 (signals SDAS and SDA). The master circuit verifies the state of wire 44 at the rising edge (time t4) of signal SCL which follows its setting to the high state of signal SDAM. If wire 44 is at the low level (as illustrated in FIG. 2), this means that the transmission has been successful. If not, the master circuit may retransmit the data (a starting condition (Start) must be transmitted over the I2C bus for this purpose). An end of transmission (bus deallocated) is performed by the master circuit by switching signal SDA to the high level while signal SCL also is at the high level (time t5). Once this stop condition (Stop) has been achieved, the I2C bus is free to start another I2C frame. It may be, for example, a transmission from circuit 3 to circuit 1. The I2C communication protocol sets different additional conditions in the transmission according to whether it concerns an address, data, a writing into or a reading from the slave circuit, etc.

For simplification, reference is made to switchings to high and low levels. In practice, an I2C bus most often operates by deallocation of the bus for the high state and forcing to the low state.

Figure 3:
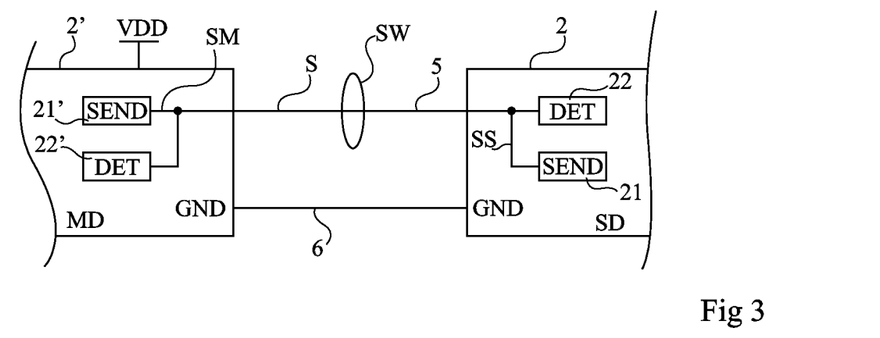
FIG. 3 partially shows in the form of blocks two circuits capable of communicating according to a master-slave protocol over a single-wire bus.

FIG. 3 is a partial block diagram of an embodiment of a single-wire bus communication system. In this example, a circuit 2', arbitrarily considered as a master device MD, is capable of communicating according to a single-wire protocol SW with a distant circuit 2 (SD). Circuits 2' and 2 are connected by a wire 5 forming the single-wire bus and share the same reference potential (connection 6, ground GND).

Each circuit 2', 2, for example, comprises a transmit circuit (SEND) 21', respectively 21, and a receive circuit (DET) 22', respectively 22. For a communication from circuit 2' to circuit 2, circuit 2' imposes a signal SM on the bus. For a communication from circuit 2 to circuit 2', circuit 2 imposes a signal SS on the bus. The circuit which causes the transmission imposes the clock on the bus. For simplification, signals SM and SS have been schematized as respectively originating from circuits 21' and 21 and it is considered that circuits 22' and 22 only see the state of the signal S present on the bus. Further, circuits 2' and 2, like circuits 1 and 3 of FIG. 1, comprise other elements, especially for exploiting the transmitted signals. Independently from the communication, master circuit 2' generally powers slave circuit 2 as illustrated in FIG. 3 where only master circuit 2' receives a power supply voltage VDD. Slave circuit 2 draws its power supply from a regulation of signal S having its quiescent level, generally imposed by circuit 2', at a high level VH.

Figure 4:
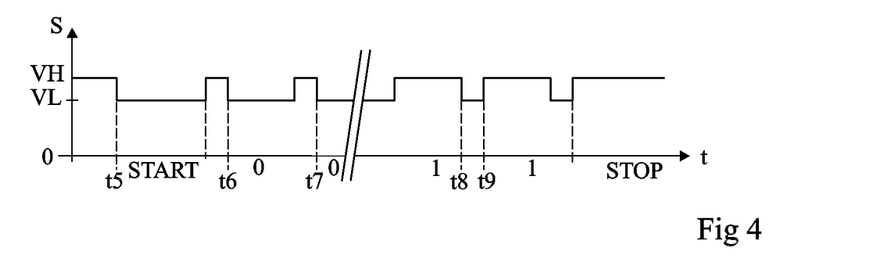
FIG. 4 is a timing diagram illustrating a communication between the two circuits of FIG. 3.

FIG. 4 is a timing diagram representing an example of the shape of signal S illustrating a communication between circuits 2' and 2.

The single-wire protocol comprises transmitting, over bus 5, both a clock or synchronization signal and the data.

To transmit data from circuit 2' to circuit 2, circuit 2' modulates signal SM in amplitude between two levels VH and VL, for example, both positive to preserve the power supply of circuit 2. This modulation appears on signal S. The idle level of the bus is high level VH. In the shown example, a transmission is initialized by a start bit START with which signal S is forced (time t5) to level VL. This initializes slave circuit 2 and prepares it to receive data. Circuit 2' modulates the level of signal S at the rate of a clock signal which sets the transmission flow rate. The transmission of a bit at level VL is for example performed with a pulse of level VL of a duration shorter than the half-period of the clock signal (in the shown example, one quarter of period T) while a level 1 is coded with a pulse of level VL of a duration greater than the half-period of this signal (for example, three quarters of period T). Slave circuit 2 detects the amplitude variation and the corresponding duration of the high and low pulses to determine the value of the transmitted bits. An end of transmission (generally the end of a frame) is coded by circuit 2' in the form of a high state (deallocation of the bus) for a time period greater than period T.

Single-wire bus SW is an alternated bidirectional communication bus (half-duplex). To transmit data from slave circuit 2 to master circuit 2', the slave circuit modifies the load that it imposes on wire S according to the bit that it desires to transmit. Here again, the transmission rate is set by a clock signal at the rate of which circuit 2 modulates the amplitude of signal S. The clock is here set by an internal clock of circuit 2 while the quiescent level (VH) of the bus remains set by circuit 2'.

Figure 5:
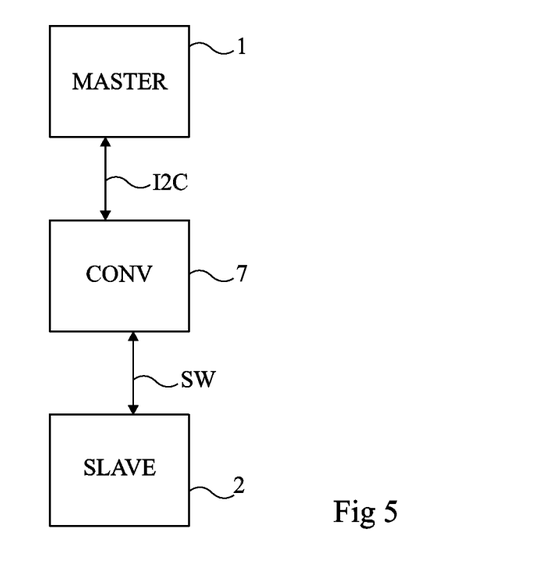
FIG. 5 is a block diagram of an embodiment of a system of communication between a master circuit and a slave circuit respectively over a two-wire bus and over a single-wire bus.

FIG. 5 is a block diagram of a simplified example of an embodiment of a system of communication between a master circuit 1 (MASTER) capable of transmitting data according to the I2C protocol and at least 1 slave circuit 2 (SLAVE) capable of communicating according to a single-wire protocol SW. The I2C bus to which master circuit 1 is connected is connected to one or several circuits 7 (CONV) of conversion into a single-wire bus SW. Each circuit 7 is connected, in this example, to a single slave circuit 2 by a single-wire access SW. The different circuits of the system may be powered independently from one another or by a power supply bus capable of conveying at least one power supply voltage VDD and one reference voltage GND, for example, the ground.

Conversion or interface circuit 7 has the function of converting on the fly the signals of the I2C bus into signals compatible with the single-wire bus and conversely. Circuit 7 is made to be transparent for both buses. In other words, circuit 1 sees the assembly of interface circuit 7 and of slave circuit 2 as a standard I2C circuit (for example, as a circuit 3, FIG. 1). Similarly, slave circuit 2 sees the assembly of circuit 1 and of interface 7 as a standard single-wire master circuit (for example, circuit 2' of FIG. 3). The present invention takes advantage from the fact that the flow rate on a single-wire bus is generally greater than the flow rate of an I2C bus.

Figure 6:
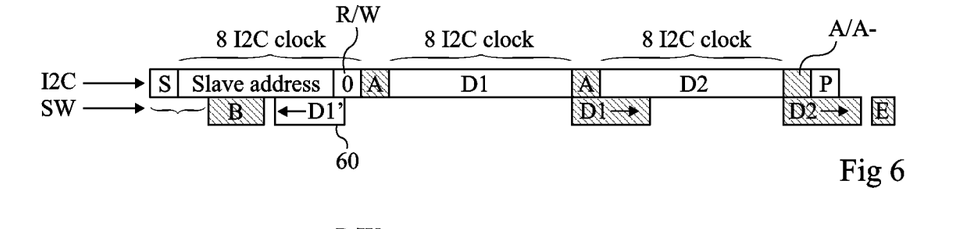
FIG. 6 schematically shows an example of transmission over the two-wire and single-wire buses of the system of FIG. 5.
Figure 7:
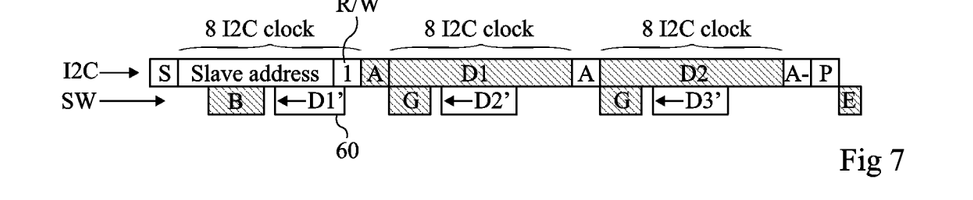
FIG. 7 illustrates another example of exchanged data frame in a system of the type in FIG. 5.
Figure 8:
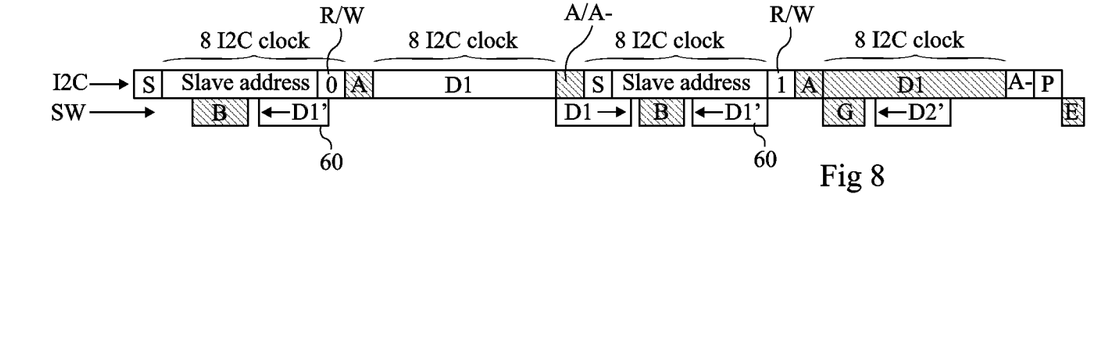
FIG. 8 illustrates still another example of data transmission in the system of FIG. 5.

FIGS. 6, 7, and 8 are examples of data exchanges in a system of the type in FIG. 5.

It is assumed that the master circuit sends over the I2C bus, data in 8-bit packets, spaced apart by a ninth acknowledgement bit (see FIG. 2). On the I2C bus side, the transmissions are performed according to any usual two-wire protocol (for example, that of FIGS. 2A to 2D).

The coding of states 0 and 1 of the bits on the single-wire bus side may be performed as in FIG. 4 or, according to any other coding adapted to a single-wire bus. The clock of the single-wire bus is set by interface circuit 7 independently from the clock of the I2C bus. Different control and data frames are present. The control frames are always sent from interface 7 to the slave circuit. The data frames may be sent from circuit 7 to circuit 2 or conversely. The control frames correspond to predefined bit chains. Each chain starts with a reference pulse (for example, of START type, FIG. 4). Three control frames which are recognizable by the slave circuit are provided. A transmission start frame, noted B, contains the reference pulse, for example, followed by a code (for example, 100) followed by the address of the slave circuit, for example, over three bits. An end frame, noted E, contains the reference pulse followed by a code (for example, 0). A polling frame, noted G, contains the reference pulse followed by still another code (for example, 101). A data frame contains the reference pulse followed by still another code (for example, 11) and by the data byte. Finally, an error code is a low state of a duration greater than the maximum duration of the low state of the bus for a normal transmission. Since, here, each circuit 7 is connected to a single slave circuit, the address in frame B is the same as the address of the interface circuit.

In the next drawings, the transmissions from the interface, be they transmissions over the I2C bus towards the master circuit or over the single-wire bus towards the slave circuit, have been hatched. These drawings illustrate, on a first line, the exchanges between the master circuit and the interface and, on a second line, the exchanges between the interface and the slave circuit.

Any transmission starts with the sending of a start bit S from the master circuit to the interface(s). This start bit is followed by a first byte at the rate of the clock signal of the I2C bus (8 I2C clock). This byte contains the address of the slave circuit (Slave address) over seven bits followed by a bit (R/W) indicative of the operation desired by the master circuit.

In the example of FIG. 6, a writing (state 0 of bit R/W) into the slave circuit is assumed. When the interface circuit has received the first byte, it sends an acknowledgement bit A to the master circuit. In this example, the master circuit then sends two data bytes D1 and D2 over eight periods of the clock signal. Each byte is followed by an acknowledgement A by the interface circuit. At the end of the second data byte, the interface circuit sends an acknowledgement A or a no-acknowledgement code A− according to whether the transmission has occurred correctly. The end of the frame is followed by the sending of a stop bit by the master circuit (P).

On the side of single-wire bus SW, an issue is that the interface circuit does not know, before having received the bit following the slave address, whether it must send data back to the master or, conversely, transmit data to the slave circuit.

According to this embodiment, the interface circuit sends a signal (B) for controlling the beginning of a transmission towards the slave circuit to which it is connected as soon as it detects a communication originating from the master circuit. This command triggers the reading of data D1' (block 60) from the slave circuit and the transmission thereof to the interface circuit where it is stored. Data D1' will or not be subsequently used according to the operation requested by the master circuit, which is not known yet. In a way, this thus is a speculative reading. This enables lengthening the time available for the response of the slave circuit and the transmission, in return, of data from the slave to the interface. Indeed, the time available between the reception by the interface of bit R/W and the time when the interface may have to recover a byte originating from the slave circuit (case where R/W=1), is in practice of one-and-a-half clock period only of the I2C protocol, which imposes a short response time of the slave circuit. Lengthening the time available for the response of the slave circuit is thus particularly advantageous.

In the example of FIG. 6, the request of the master circuit is a write operation. Accordingly, data D1' of the slave is not used.

All the interface circuits connected to the master circuit here perform this speculative reading. However, only the interface circuit which recognizes itself in address Slave will carry on.

After the reception of first data D1 of the master circuit by the interface circuit, the latter transmits data D1 over the single-wire bus towards the slave circuit. The same occurs at the end of the transmission of data D2. The interface notifies the slave circuit of the end of a transmission by a control signal E which occurs subsequently to the end of the I2C frame.

If no slave circuit is present or responds to speculative command B for reading data D1, the interface circuit may send, from as soon as the first byte over the I2C bus, a no-acknowledgement bit.

FIG. 7 shows an example corresponding to a data reading from the slave circuit. As in the case of FIG. 6, the frame starts on the side of the I2C bus with a start bit S followed by the slave address over seven bits, the byte being ended by a bit R/W, here indicative of a reading (state 1) from the slave circuit. In this case, speculative data D1', read on the slave circuit side during the transmission of the address over the I2C bus will be used. After the obtaining by the interface circuit of bus R/W at state 1, it sends back data D1' to the master circuit. Further, it sends over the single-wire bus command G for obtaining next data. The detection of this control signal by the slave circuit makes it send second data (D2') to the interface circuit which is then capable of transmitting said data to the master circuit at the next byte. Third data (D3'), which will not be used, are then read from the slave circuit. The transmission over the I2C bus ends with a no-acknowledgement code (A−) followed by a stop bit (P) transmitted by the master circuit to the interface circuit. On the single-wire bus, the transmission also ends by the sending of an end chain E to the slave circuit.

FIG. 8 is a third example illustrating a writing followed by a reading from the slave circuit. The first byte of the I2C frame is identical to that of FIG. 6 and speculatively-read data D1' have not been used. The second byte of the I2C frame is the sending of data D1 to the slave circuit. These data are transmitted at the end of this byte as in FIG. 6. The master circuit returns a start bit S just after acknowledgement A/A− of data D1. The interface circuit then causes a second speculative reading of data D1' from the slave circuit at the same time as it receives the slave address from the master circuit. Since bit R/W is at state 1, the speculative data received by the interface circuit are used on the I2C bus side to be transmitted to the master circuit. Due to the state of bit R/W, the interface circuit causes the reading (G) of second data (D2') on the single-wire bus side. The end of the transmission is similar to that of FIG. 7.

As indicated previously, the communication speed on the single-wire bus side must be greater than the communication speed on the I2C bus side (or another bus converted on the fly into a single-wire bus), failing which the real time conversion cannot be performed.

Preferably, the slave circuit demodulates the frame that it sends and performs, at the end of the transmission, a comparison between the frame to be sent and the demodulated frame, to send an error message in the occurrence of an inconsistency.

The same operation may be provided on the master circuit side.

Figure 9:
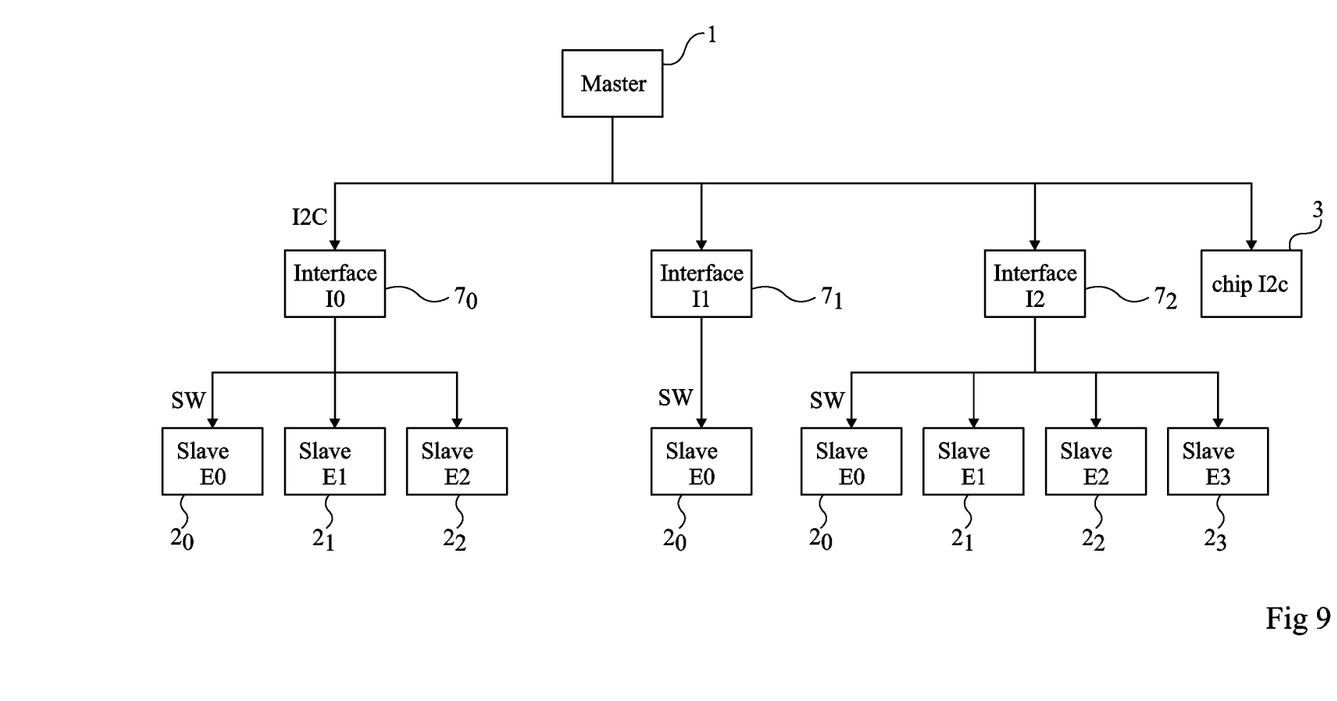
FIG. 9 is a block diagram of another example of architecture of a communication system between a master circuit communicating over a two-wire bus and several slave circuits communicating over single-wire buses.

FIG. 9 is a block diagram of an example of a transmission system of a master circuit communicating over an I2C bus with several interface circuits 70 (Interface I0), 71 (Interface I1), and 72 (Interface I2). In the example of FIG. 9, each interface circuit communicates with one or several slave circuits over a single-wire bus SW. For example, circuit 70 communicates with three slave circuits 20 (Slave E0), 21 (Slave E1), and 22 (Slave E2). Circuit 71 only communicates with a single slave circuit 20. As for circuit 72, it communicates with four slave circuits 20 (Slave E0), 21 (Slave E1), 22 (Slave E2), and 23 (Slave E3). Finally, master circuit 1 is capable of communicating with another circuit 3 (chip I2C) over bus I2C independently from the described interface circuits.

Preferably, the interface circuit automatically recognizes the addressing mode implemented on the I2C bus side to adapt the communication with the slave. In the described example, a same interface can then indifferently operate in a mode where the addressing is performed over 7 bits or over 10 bits.

A communication in a system such as illustrated in FIG. 9 requires being able to identify, not only the interface circuit, but also the slave circuit for which the transmission is intended. A functionality of the I2C bus that may operate with more than seven address bits (for example, ten address bits) is used for this purpose. In order to do this, the first byte of the transmission contains, as previously, seven address bits and bit R/W. However, these then are the seven most significant bits of the address. The second byte contains the eight least significant bits of the address. This possibility is here used, for example, to identify the interface circuit with the first byte and identify the slave circuit with the second byte. It should be noted that, in the I2C protocols, some of the address bits (for example, the first four) are generally reserved to identify the type of slave. These four bits may also identify the addressing mode over two bytes instead of one.

Figure 10:
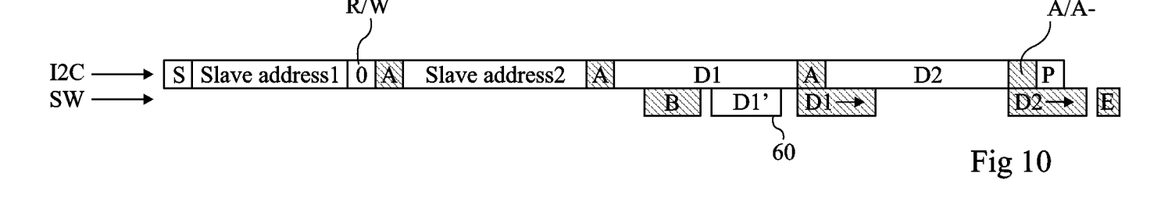
FIG. 10 illustrates an example of transmission, adapted to the system of FIG. 9.
Figure 11:
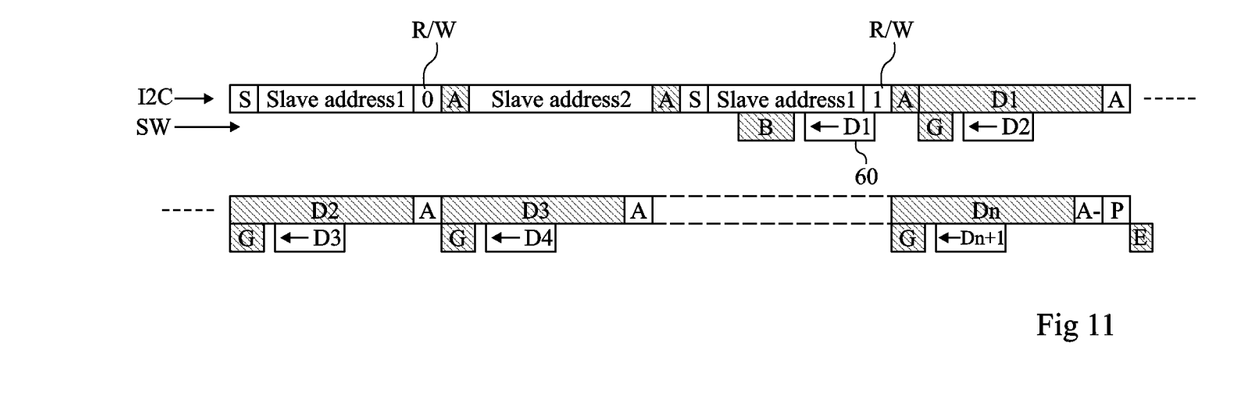
FIG. 11 illustrates an example of transmission, adapted to the system of FIG. 9.

Such an operation is illustrated in FIGS. 10 and 11.

FIG. 10 illustrates an example of communication for the writing of data into a slave circuit. On the I2C bus side, master circuit 1 starts with a start bit S, then sends the seven most significant bits of the address (Slave address1). For example, the last two bits of this address identify the interface circuit out of four circuits and the first four bits identify the passing to an addressing over two bytes. This address is followed by a bit R/W which, for an addressing over two words, always is at state 0. The interface circuit which recognizes itself is able to send acknowledgement bit A. The master circuit sends, in the second frame, the eight address bits (Slave address2) of the slave circuit. The number of useful bits actually depends on the number (for example, eight) of connectable slave circuits per interface on the single-wire bus side.

When it receives second address Slave address2, the interface circuit which has recognized itself with the first address stores the address of the slave.

Then, when the first data byte reaches the interface, said interface sends a frame B to the slave circuits which are connected thereto. Only that which will recognize itself in the address sent in frame B will respond and send a data word (speculative response D1'). When the interface circuit has received data D1 over the I2C bus, it transmits it to the slave circuit in single-wire mode as described in relation with FIG. 6.

FIG. 11 illustrates another example of transmission in which a data reading is performed from a slave circuit. As for the embodiment illustrated in FIG. 10, master circuit 1 sends the first two bytes identifying the interface and the slave. Then, as illustrated in FIG. 8, it sends a second start bit S. The interface recognizes that it is a reading by bit R/W at state 1. The example of FIG. 11 illustrates the reading of Dn+1 successive data bytes.

The above-described implementation exploits an I2C protocol described, for example, in document "UM10204-I2C-bus specification and user manual", Rev. 03-19 Jun. 2007 of NXP Company to which reference may be made.

An advantage embodiments is that it is now possible to implement an asynchronous operation between an I2C bus and a single-wire bus. This asynchronous operation is in particular allowed by the speculative reading performed on the single-wire bus side to prepare a possible read command by a master circuit communicating in I2C mode.

Various embodiments have been described. Various alterations, modifications, and improvements will occur to those skilled in the art. Further, the practical implementation of the present invention is within the abilities of those skilled in the art based on the functional indications given hereabove for hardware tools currently used in I2C and single-wire communications. Of course, the interface circuits will have to comprise the hardware and software storage and processing elements necessary for the discussed conversion.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of conversion by at least one interface circuit connected between a first bus comprising at least one data wire and one clock wire, and at least one second single-wire bus, of a transmission between a master circuit connected to the first bus and at least one slave circuit connected to the second bus, wherein a speculative read command is sent to the slave circuit before interpreting the state of a bit for controlling reading or writing, originating from the master circuit, wherein the speculative read command triggers a read operation by the slave circuit, independent of the state of the bit for controlling reading or writing, and transmission of speculative read data from the slave circuit to the interface circuit, wherein the speculative read data is transmitted by the interface circuit to the master circuit when the state of the bit for controlling reading or writing indicates reading, and otherwise the speculative read data is discarded.

2. The method of claim 1, wherein said speculative command is a start-of-transmission signal.

3. The method of claim 2, wherein the interface circuit is capable of transmitting towards the slave circuit, in addition to the start-of-transmission signal, a read control signal and an end-of-transmission signal.

4. The method of claim 1, wherein an error message on the single-wire bus side corresponds to a low state having a longer duration than the low state of a normal transmission.

5. The method of claim 2, wherein, on the single-wire bus side, a slave circuit which sends a frame demodulates the frame that it sends and performs, at the end of the transmission, a comparison between the frame to be sent and the demodulated frame, to send the error message in the occurrence of an inconsistency.

6. The method of claim 1, wherein the master circuit starts a transmission by the sending of two successive frames respectively comprising the address of an interface circuit and the address of a slave circuit.

7. A transmission system comprising:
a master circuit capable of transmitting data according to an I2C protocol;
at least one interface circuit between this I2C protocol and a single-wire bus protocol; and
at least one slave circuit per interface circuit capable of communicating with this interface circuit according to a single-wire protocol,
these circuits being capable of implementing the method of claim 6.

8. The system of claim 7, wherein the interface circuit automatically detects the addressing mode adopted by the master circuit.

9. The method of claim 1, wherein the master circuit starts a transmission by sending a frame comprising the common address of an interface circuit and of a slave circuit.

10. A transmission system comprising:
a master circuit capable of transmitting data according to an I2C protocol;
at least one interface circuit between this I2C protocol and a single-wire bus protocol; and
at least one slave circuit per interface circuit capable of communicating with this interface circuit according to a single-wire protocol,
these circuits being capable of implementing the method of claim 9.

11. The system of claim 10, wherein the interface circuit automatically detects the addressing mode adopted by the master circuit.

12. A transmission system comprising:
a master circuit capable of transmitting data according to an I2C protocol;
at least one interface circuit between this I2C protocol and a single-wire bus protocol; and
at least one slave circuit per interface circuit capable of communicating with this interface circuit according to a single-wire protocol,
these circuits being capable of implementing the method of claim 1.

13. A method of interfacing between a two-wire bus and a single-wire bus, comprising:
receiving, by an interface circuit, a transmission on the two-wire bus from a master circuit addressed to a slave circuit;
sending, by the interface circuit, a speculative read command on the single-wire bus to the slave circuit before a state of read/write information contained in the transmission from the master circuit is determined, wherein the speculative read command triggers a read operation by the slave circuit, independent of the state of the read/write information, and transmission of speculative read data from the slave circuit to the interface circuit; and
sending, by the interface circuit, the speculative read data to the master circuit when the state of the read/write information indicates a read command, and otherwise discarding the speculative read data.

14. A method as defined in claim 13, wherein the speculative read command comprises a start-of-transmission signal.

15. A method as defined in claim 13, wherein the master circuit starts a transmission by sending a frame including an address of the slave circuit.

16. A method as defined in claim 13, wherein receiving a transmission on the two-wire bus comprises receiving data according to the I2C protocol.

17. A method of interfacing between a two-wire bus and a single-wire bus, comprising:
receiving, by an interface circuit, a transmission on the two-wire bus from a master circuit addressed to a slave circuit; and
sending, by the interface circuit, a speculative read command on the single-wire bus to the slave circuit before a state of read/write information contained in the transmission from the master circuit is determined, wherein the master circuit starts a transmission by sending two successive frames including an address of the interface circuit and an address of the slave circuit.

18. A transmission system comprising:
a master circuit;
an interface circuit coupled to the master circuit by a two-wire bus; and
a slave circuit coupled to the interface circuit by a single-wire bus, wherein the interface circuit is configured to receive from the master circuit a transmission addressed to the slave circuit, to send a speculative read command to the slave circuit before a state of read/write information contained in the transmission from the master circuit is determined, wherein the speculative read command triggers a read operation by the slave circuit, independent of the state of the read/write information, and transmission of speculative read data from the slave circuit to the interface circuit, to send the speculative read data from the interface circuit to the master circuit when the state of the read/write information indicates a read command, and to otherwise discard the speculative read data.

* * * * *